United States Patent
Kawano et al.

(10) Patent No.: US 6,325,276 B1
(45) Date of Patent: Dec. 4, 2001

(54) METHOD AND APPARATUS FOR APPLYING FLUX FOR USE IN BRAZING ALUMINUM MATERIAL

(75) Inventors: Makoto Kawano; Ryoji Matsunami; Tatsuya Fujiyoshi, all of Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 09/362,029

(22) Filed: Jul. 28, 1999

(30) Foreign Application Priority Data

| Jul. 29, 1998 | (JP) | 10-214485 |
| Jul. 29, 1998 | (JP) | 10-214488 |
| Aug. 25, 1998 | (JP) | 10-239172 |
| Aug. 25, 1998 | (JP) | 10-239175 |

(51) Int. Cl.[7] ................................. B23K 31/02
(52) U.S. Cl. ......................... 228/183; 228/223
(58) Field of Search .................. 228/183, 209, 228/215, 223, 25, 26; 148/26; 427/310

(56) References Cited

U.S. PATENT DOCUMENTS

| 3,652,380 | * | 3/1972 | Strack . |
| 3,900,412 | * | 8/1975 | Kosel . |
| 4,076,670 | * | 2/1978 | Godfrey . |
| 4,288,649 | * | 9/1981 | McCaulay . |
| 4,867,312 | * | 9/1989 | Comert et al. . |
| 4,906,307 | * | 3/1990 | Fujiyoshi . |
| 4,911,351 | * | 3/1990 | Ishikawa et al. . |
| 5,173,126 | * | 12/1992 | Ogura et al. . |
| 5,344,520 | * | 9/1994 | Seki et al. . |
| 5,360,158 | * | 11/1994 | Conn et al. . |
| 5,691,286 | * | 11/1997 | Stepan . |
| 5,755,374 | * | 5/1998 | Prigmore . |
| 5,781,846 | * | 7/1998 | Jossick . |
| 5,859,114 | * | 1/1999 | Davis et al. . |

FOREIGN PATENT DOCUMENTS

| 2 299 287 | 10/1996 | (GB) . |
| 2 303 089 | 2/1997 | (GB) . |
| 1-143794 | 6/1989 | (JP) . |
| 3-275272 | 12/1991 | (JP) . |
| 4-98367 | 8/1992 | (JP) . |
| 4-288493 | 10/1992 | (JP) . |
| 4-322896 | 11/1992 | (JP) . |
| 4-351267 | 12/1992 | (JP) . |
| 5-277723 | 10/1993 | (JP) . |
| 95/08403 | 3/1995 | (WO) . |

OTHER PUBLICATIONS

Nippes, Ernest. 1983. Metals Handbook: Ninth Edition vol. 6 Welding, Brazing, and Soldering. P. 3.*

* cited by examiner

*Primary Examiner*—Tom Dunn
*Assistant Examiner*—Jonathan Johnson
(74) *Attorney, Agent, or Firm*—Foley & Lardner (57) ABSTRACT

Fluoride-based flux is uniformly dispersed in and mixed with synthetic resin, which has fluidity at room temperature and sublimes at a temperature lower than a brazing temperature, so as to constitute 40 to 70 wt. % of the mixture, thereby producing coating material. This coating material is applied to coating belts which undergo rotation and is transferred from the coating belts to the surface of the aluminum material. The coating material has high viscosity and stably adheres to the transferred areas.

4 Claims, 11 Drawing Sheets

| | | CONCENTRATION OF FLUX INCLUDED IN COATING MATERIAL (wt.%) | AMOUNT OF FLUX TO BE APPLIED (g/m²) | COMPRESSIVE STRENGTH (Mpa) | HEAT RADIATION PERFORMANCE | EVALUATION |
|---|---|---|---|---|---|---|
| EMBODIMENT | 1 | 40 | 2.5 | 3.9 | 103 | ○ |
| | 2 | 50 | 3 | 4.5 | 105 | ◎ |
| | 3 | 60 | 4.2 | 4.6 | 104 | ◎ |
| | 4 | 70 | 5.8 | 4.6 | 104 | ○ |
| COMPARATIVE EXAMPLE | 1 | 35 | 1.8 | 2.8 | 98 | × |
| | 2 | 75 | 6.5 | 4.7 | 100 | △ |

METHOD AND APPARATUS FOR APPLYING FLUX FOR USE IN BRAZING ALUMINUM MATERIAL

BACKGROUND OF THE INVENTION

1. Field of the Invention

The present invention relates to a method and apparatus for applying flux for use in brazing aluminum or an aluminum alloy (which are collectively called as "aluminum material") and is employed for in the manufacture of various products (for example, a radiator or a condenser).

The present application is based on Japanese Patent Applications No. Hei. 10-214485, 10-214488, 10-239172 and 10-239175, which are incorporated herein by reference.

2. Description of the Related Art

For example, in the case of manufacture of a heat exchanger from aluminum material, heat-transfer tubes made of aluminum material and radiation fins made of aluminum material are assembled, and the assembly is heated in a heating furnace, thereby fusing brazing filler metal (an aluminum alloy containing 5–16% Si) that is interposed beforehand between the heat-transfer tubes and the radiation fins. The heat-transfer tubes and the fins are brazed by means of the brazing filler metal.

In order to achieve high-quality brazing between the heat-transfer tubes and the radiation fins, fluoride-based flux is applied to the portions of the tubes and fins which are to be brazed, so as to fracture an oxide film covering the surface of the aluminum material constituting the heat-transfer tubes and the radiation fins.

The fluoride-based flux comprises 65.6–99.9 wt. % $KAlF_4$ and 34.4 to 0.1 wt. % $K_3AlF_6$ and is commercially available under the trade name NOCOLOK FLUX.

A method of applying this flux is described in Japanese Patent Publication Nos. Hei. 1-143796, Hei. 3-275272 and Hei. 4-322896 or the like.

Japanese Patent Publication No. Hei. 1-143796 describes a method whereby flux can be applied solely to areas requiring coating by use, as a dispersion medium, of polybutene whose viscosity is greater than that of water and which sublimes with an increase in temperature. Japanese Patent Publication No. Hei. 3-275272 describes industrially efficient manufacture of an aluminum heat exchanger by coating of flux, which includes polybutene as a dispersion medium, to a traveling coating belt and by transfer of the flux to the surface of aluminum material from the coating belt.

Neither of these patent coatings specifically discloses correlation between the amount of flux added to polybutene and means for applying the flux. The former publication describes only the amount of flux added to polybutene but contains no description of a measure for applying the flux. The latter patent publication describes only means for applying flux and contains no description about the amount of flux added to polybutene.

Further, coating material of the above slime-like flux is applied primarily by manual paint with a brush. Accordingly, the amount of flux applied on the surface of a component becomes non-uniform, for example, such as on the tope peaks of a corrugated component used in the core of the heat exchanger. Further, during a painting process, flux is splashed, thereby staining surrounding facilities.

With regard to coating material formed by addition of flux into polybutene, the viscosity of the coating material increases with an increase in the amount of flux contained in the coating material. Consequently, coating material containing a small amount of flux has low viscosity and, hence is applicable to a spraying method or a dipping method. However, such coating material is not suitable for a transfer method employing an coating belt. On the other hand, coating material containing a large amount of flux has high viscosity and, hence can be applied to a transfer method employing an coating belt as coating means. However, such coating material is not suitable for a spraying method or a dipping method.

As mentioned above, in connection with the method of applying flux for use in brazing aluminum material, a close correlation exists between the amount of flux added to polybutene and means for applying the flux.

The present inventor found that most of the areas requiring coating of flux are narrow and that coating material doped with flux is required to have high viscosity for adherence to the narrow areas after coating. On the basis of this finding, the present inventor has completed the present invention.

Incidentally, a core of a heat exchanger, such as an evaporator or a condenser, employed in an automobile cooling system is usually constituted by stacking in an alternating manner a plurality of corrugated outer fins and a plurality of flat coolant tubes into a layer of required width. After the ends of the respective coolant tubes of the core are inserted into tube insertion holes formed in header tanks, powder flux or a flux solution is sprayed onto the overall core, whereby the flux adheres to the core. This core is then heated in a heating furnace, to thereby braze together the top peaks of the corrugated outer fins and the coolant tubes remaining in contact with the outer fins.

Flux adheres to areas of the core other than the areas to be brazed, thus wastefully consuming flux and disadvantageously adding to cost. Further, splashing of flux deteriorates the working environment and stains surrounding facilities.

SUMMARY OF THE INVENTION

An object of the present invention is to provide a method of applying flux for use in brazing aluminum material which enables coating of flux to only areas requiring coating of flux, enables stable holding of an amount of flux required for brazing in areas requiring coating, and improves the reliability of brazing.

Another object of the present invention is to provide a flux coating apparatus which can automatically and uniformly apply slime-like flux to the surface of a component and prevents staining of surrounding facilities, which would otherwise be caused by splashing of flux.

Still another object of the present invention is to provide a heat exchanger manufacturing method which prevents waste of flux, deterioration of the working environment, and staining of surrounding facilities, which would otherwise be caused by splashing of flux.

To achieve the object, according to a first aspect of the present invention, there is provided a method of applying flux for use in brazing aluminum material. The fluoride-based flux is uniformly dispersed and mixed in and with synthetic resin which has fluidity at room temperature (generally 20° C. to 25° C.) and sublimes at a temperature lower than a brazing temperature, to thereby constitute 40 to 70 wt. % of the mixture. The mixture is applied to coating belts which travel, and transferred to the surface of aluminum material.

The synthetic resin doped with flux has high viscosity and can stably adhere to areas on the coating belt and the surface of the aluminum material where the synthetic resin is transferred, without being removed.

The amount of flux added to synthetic resin is increased, so that the amount of flux required for brazing can be ensured by means of a small amount of coating material to be transferred. The amount of synthetic resin to be transferred can be reduced accordingly, to thereby increase a rate at which synthetic resin sublimes in a sublimation process before the brazing process and to save energy.

The synthetic resin doped with flux is transferred from the coating belts to the surface of aluminum material, and hence the synthetic resin is inevitably applied to the top peaks of aluminum material which are to be brought into contact with another aluminum material at the time of assembly. Consequently, flux can be applied to only the areas requiring coating.

Preferably, at least one side of the coating belt facing aluminum material is formed from elastic material which is deflected upon receipt of pressing force from the aluminum material at the time of transfer of the synthetic resin.

The coating belt is deflected at the time of transfer of the synthetic resin, to thereby cover, with the synthetic resin, the areas of aluminum material to be coated. Accordingly, synthetic resin doped with flux can be stably transferred from the coating belts to the areas of the aluminum materials to be coated.

According to a second aspect of the present invention, there is provided a flux coating apparatus. A pair of feed rollers is rotated in opposite directions while remaining in contact with each other, wherein an area above the line of contact between the feed rollers is taken as an inlet section for storing a slime-like flux. Dam members are provided along and remain in sliding contact with end faces on opposite ends of the pair of feed rollers so as to prevent the flux from flowing laterally from the inlet section. A pair of endless coating belts are spaced at a required interval so as to be mutually opposed in a vertical direction and which are rotated in opposite directions. At least one of the pair of feed rollers is in contact with at least one of the pair of endless coating belts, thereby transferring the flux to the surface of the endless coating belt. The surface of the endless coating belt coated with the flux comes into elastic contact with an introduced component to be coated with flux, to thereby coat the surface of the component with the flux during the course of feeding of the component in a single direction.

Preferably, each of the endless coating belts is provided with flux guides for collecting the flux adhering to the surface of the endless coating belts to a required width.

Preferably, the lower endless coating belt extends longer than does the upper endless coating belt in the direction from which the component is introduced, to thereby constitute a component inlet section for receiving the component 15.

The slime-like flux stored in an inlet section uniformly adheres to the surfaces of a pair of feed rollers as a result of rotation of the feed rollers, and flux is uniformly transferred from the surface of the feed rollers to the surfaces of a pair of upper and lower endless coating belts remaining in contact with the feed rollers. Flux can be uniformly applied to the surface of a component to be coated with flux which is introduced between and comes into elastic contact with the pair of upper and lower endless coating belts.

The surface of the component can be coated with flux without generating irregularities, thus enabling proper brazing of the component.

As mentioned above, flux can be automatically applied to the surface of the component by means of the endless coating belt, thus preventing splashing of flux and staining of surrounding facilities.

The flux adhering to the surface of the endless coating belts is collected to a required width by means of flux guides, thus preventing staining of surrounding facilities, which would otherwise be caused by the flux spreading to and falling from the side edges of the respective endless coating belts.

The component inlet section is provided on the lower endless coating belt so as to extend beyond the upper endless coating belt in the direction from which a component is introduced, and hence the component can be readily transferred to the component inlet section. Accordingly, a component can be readily and smoothly introduced between the upper and lower endless coating belts, thus efficiently coating the component with flux.

According to a third aspect of the present invention, there is provided another type of flux coating apparatus. A pair of endless coating belts are vertically spaced a predetermined interval so as to be mutually opposed. The coating belts are rotated in opposite directions and brought into elastic contact with the top peaks of a corrugated component to be introduced between a clearance between the opposing portions of the endless coating belts, and apply slime-like flux to the top peaks during the course of feeding the corrugated component in a single direction. A pair of presser plates presses the opposing portions of the endless coating belts against the top peaks of the corrugated component.

Preferably, a clearance between the pair of presser plates in the vicinity of a component inlet side is set so as to become sufficiently greater than the height of the corrugated component.

Preferably, the pair of presser plates are vertically adjustable.

In the flux coating apparatus according to the present embodiment having the foregoing configuration, when a corrugated component is introduced between a pair of upper and lower endless coating belts, the endless coating belts are brought into elastic contact with the top peaks of the corrugated component at a given, uniform contact pressure, and flux can be uniformly applied to the top peaks of the corrugated product during the process of feeding of the corrugated product in the direction designated by the outlined arrow.

The flux is prevented from being applied to the top peaks of the corrugated component in insufficient or excessive amount, thus enabling proper brazing of the corrugated component.

As mentioned above, by means of the presser plates the pair of endless coating belts are brought into resilient contact with the top peaks of the corrugated outer fin at a given, uniform contact pressure, thereby preventing deformation of the corrugated component.

The flux can be automatically applied to the top peaks of the corrugated component by means of the pair of endless coating belts, thus preventing staining of surrounding facilities, which would otherwise be caused by splashing of the flux.

The clearance between the pair of presser plates in the vicinity of a component inlet section is set so as to become sufficiently greater than the height of the corrugated component, thereby enabling smooth introduction of the corrugated component into the clearance between the opposing surfaces of the pair of endless coating belts and realizing smooth flux coating operation.

The presser plates are vertically adjustable. Vertical adjustment of the presser plates enables appropriate control of contact pressure at which the pair of endless coating belts are brought into contact with the top peaks of the corrugated fin, optimization of the amount of flux applied to the top peaks of the corrugated component, and reliable prevention of deformation of the corrugated component.

According to a fourth aspect of the invention, there is provided a method of manufacturing a heat exchanger. The slime-like is applied to the top peaks of corrugated outer fins. A plurality of outer fins and a plurality of flat tubes are stacked in an alternating manner, to thereby constitute a core having a required width. The ends of the tubes of the core is inserted into tube insertion holes of header tanks, and the core is heated in a heating furnace, thereby brazing together the top peaks of the corrugated outer fins and the tubes remaining in contact therewith.

Preferably, the slime-like flux is applied beforehand to either the peripheral edges of the tube insertion holes formed in the header tanks or the edges of the tubes, and at the time of brazing of the outer fins and the tubes through heating in the heating furnace, the peripheral edges of the tube insertion holes of the header tanks and the ends of the respective tubes are brazed.

According to the present invention, assembly of the core of a heat exchanger involves application of the slime-like flux to solely the top peaks of the corrugated outer fins which are stacked with the coolant tubes of the condenser core in an alternating manner and must be brazed. The areas other than those required to be brazed are not coated with the flux, thus eliminating wasteful consumption of the flux and enabling advantageous manufacture of the core at reduced cost.

As mentioned above, the flux 10 is applied to solely the top peaks of the outer fins 4. Further, slime-like flux comprising resin material as a dispersion medium is used, there can be prevented deterioration of the working environment and staining of surrounding facilities, which would otherwise be caused by splashing of the flux 10.

Further, the slime-like flux is applied beforehand to either the peripheral edges of the tube insertion holes formed in the header tanks or the edges of the coolant tubes to be inserted into the tube insertion holes. Simultaneously with brazing of the outer fins and the coolant tubes through heating in a heating furnace, the peripheral edge of each of the tube insertion holes of the header tanks and the ends of the respective coolant tubes are brazed, thus improving work efficiency and productivity in manufacture of a heat exchanger.

Features and advantages of the invention will be evident from the following detailed description of the preferred embodiments described in conjunction with the attached drawings.

BRIEF DESCRIPTION OF THE DRAWINGS

In the accompanying drawings:

FIGS. 5A to 5C show a clad plate constituting a heat-transfer tube of the heat exchanger, wherein

FIGS. 7A and 7B show a heat exchanger, wherein

DETAILED DESCRIPTION OF THE PREFERRED EMBODIMENTS

Embodiments of the present invention will now be described by reference to the accompanying drawings.

Figure 1:
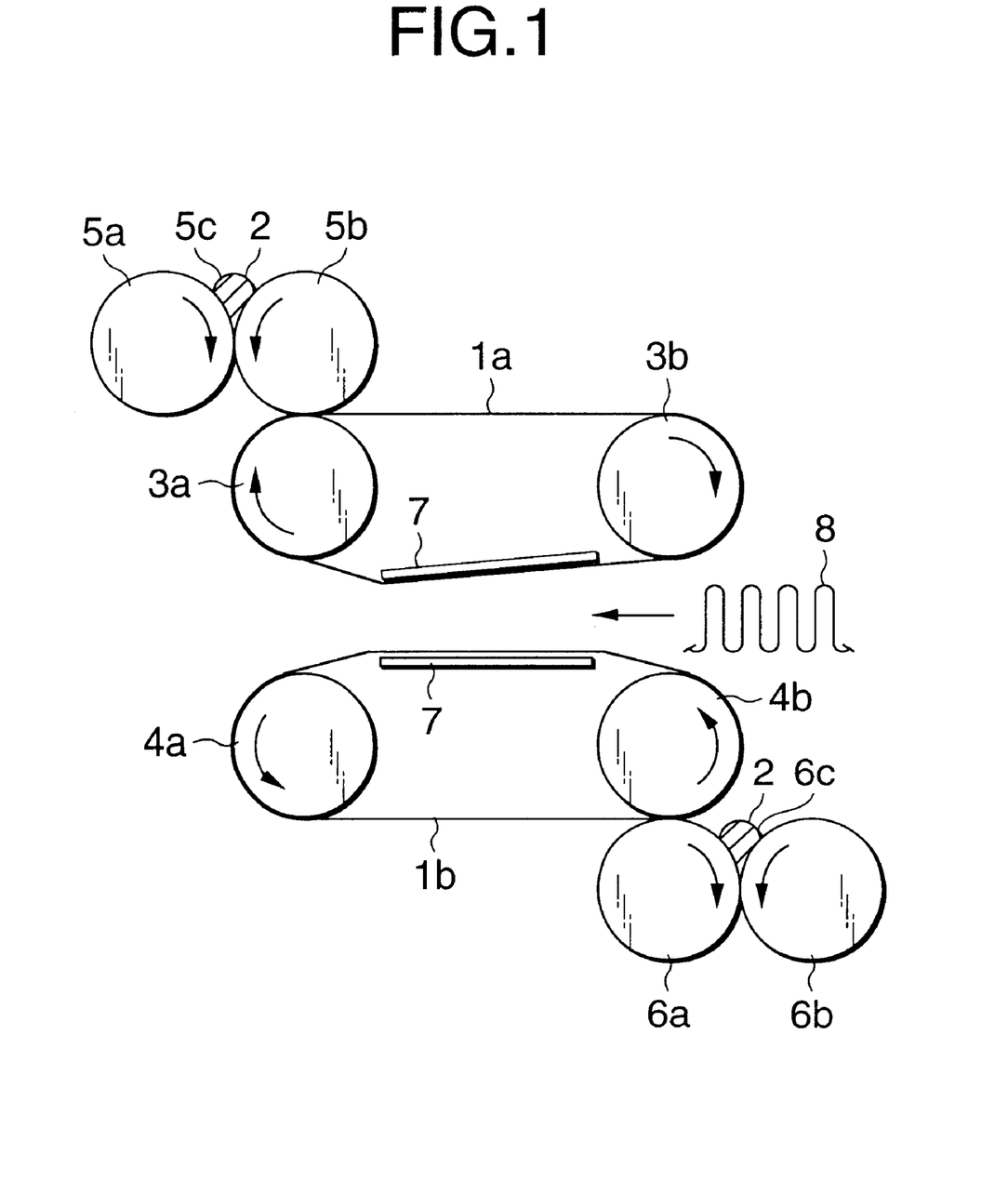
FIG. 1 is a schematic diagram showing a coating apparatus for effecting a method of applying flux for use in brazing aluminum material according to one embodiment of the present invention.

FIG. 1 shows a coating apparatus for carrying out a method of applying flux for use in brazing aluminum material according to one embodiment of the present invention. According to the coating method, the coating apparatus applies coating material comprising flux dispersed and mixed in synthetic resin to a traveling coating belt, with the result that the coating material is transferred to the surface of the aluminum material from the coating belt.

The coating apparatus substantially comprises a pair of guide rollers 3a and 3b; an endless coating belt 1a extending between the guide rollers 3a and 3b; another pair of guide rollers 4a and 4b which are located below and are made opposed to the guide rollers 3a and 3b; an endless coating belt 1b extending between the guide rollers 4a and 4b; a pair of feed rollers 5a and 5b provided above the guide roller 3a; a pair of feed rollers 6a and 6b provided below the guide roller 4b; and a pair of height control plates 7, 7 for controlling the clearance between the coating belts 1a and 1b, with one plate thereof being disposed within the coating belt 1a so as to push the coating belt 1a toward the coating belt 1b and the other plate being disposed within the coating belt 1b so as to push the coating belt 1b toward the coating belt 1a.

In the coating device, as shown in FIG. 1, the guide roller pairs 3a, 3b and 4a, 4b and the feed roller pairs 5a, 5b and 6a, 6b are rotated in the directions designated by arrow shown in FIG. 1. As a result, the coating belts 1a and 1b travel in the same direction, and coating material 2 inserted into inlet sections 5c and 6c is formed into a thin layer on the surface of the feed rollers 5b and 6a. The thin layer formed on the feed roller 5b is transferred to the coating belt 1a which undergoes rotation, and the thin layer formed on the feed roller 6a is transferred to the coating belt 1b which undergoes rotation. Aluminum material (the fin 8 of the heat exchanger is illustrated in FIG. 1) is conveyed through the clearance between the coating belts 1a and 1b, to thereby transfer the coating material 2 to the respective upper and lower surfaces of the aluminum material. In this coating apparatus, in a case where the coating material 2 is applied to solely either the upper or lower surface of aluminum material, the coating material 2 is fed to a corresponding inlet section of one of the inlet sections 5c and 6c.

Under the coating method according to the present invention, in which the coating material 2 is transferred from the coating belts 1a and 1b to the surface of aluminum material, the coating material is inevitably applied to the top peaks of corrugated aluminum material which are to be brought into contact with another aluminum material at the time of assembly. Consequently, flux can be applied to only the areas requiring coating.

The coating material 2 is formed by uniformly dispersing or mixing fluoride-based flux consisting of 65.6–99.9 wt. % $KAlF_4$ and 34.4 to 0.1 wt. % $K_3AlF_6$ into synthetic resin— which has fluidity at room temperature and sublimes at a temperature lower than brazing temperature—so as to constitute 40 to 70 wt. % of the coating material 2.

Fluoride-based flux which is commercially available under the trade name "NOCOLOK FLUX" is used as fluoride-based flux.

Synthetic resin possesses fluidity at room temperature, depolymerizes at a temperature lower than brazing temperature (about 600° C.), and sublimes completely. For example, polybutene or acrylic acid-based resin, such as butyl acrylate, is used as synthetic resin. For example, polybutene having a mean molecular weight of 200 to 2500 can be used. The polybutene sublimes substantially completely at 450° C. and leaves no residue.

The amount of flux added to synthetic resin is set to 40 to 70 wt. %. The reason for this is that, when the amount of flux falls within this range, there can be produced the coating material 2 which has viscosity enabling stable adherence to the coating belts 1a and 1b and a transfer region on the surface of the aluminum material (fin 8) without losing fluidity and which can ensure the amount of flux sufficient for brazing even when transferred in a small amount.

Figure 2:
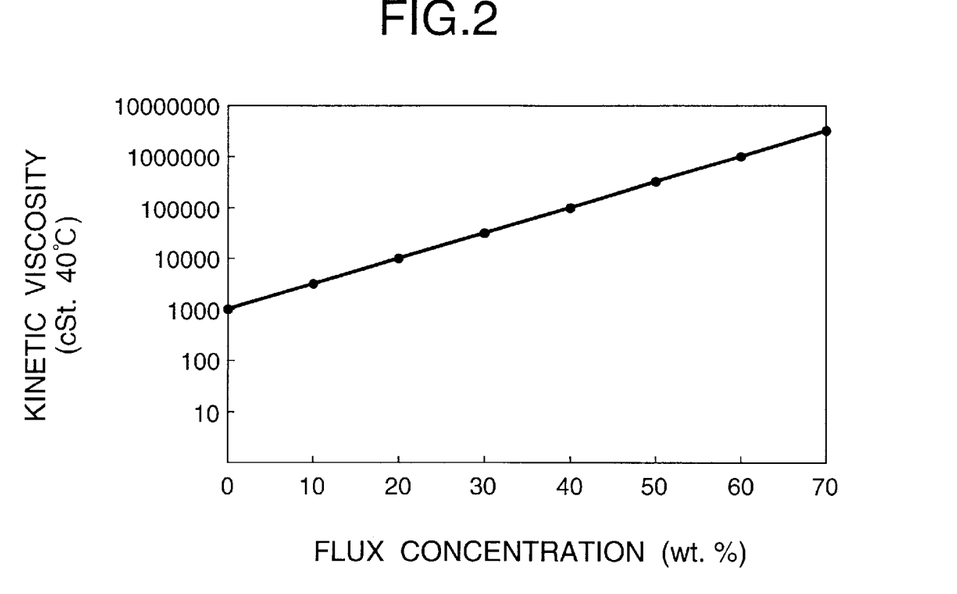
FIG. 2 is a graph showing a relationship between the concentration of flux included in synthetic resin and the kinetic viscosity of synthetic resin doped with flux.

FIG. 2 shows the relation between flux concentration (wt. %) and kinetic viscosity (cSt. 40° C.) when flux is added to polybutene having a mean molecular weight of 1000, for various concentrations of flux. The kinetic viscosity is increased with an increase in flux concentration, and a kinetic viscosity of 100000 cSt. (at 40° C.) can be obtained at a flux concentration of 40 wt. %. Even when flux becomes highly viscous at an excessive flux concentration of 50 wt. %, flux can be readily dispersed uniformly in synthetic resin through use of an electric agitator having stirring vanes.

The coating material 2 having a kinetic viscosity of 100000 cSt. (at 40° C.) can be formed into a thin layer on the surface of the feed rollers 5a, 5b, 6a, and 6b without losing fluidity and can be applied to the coating belts 1a and 1b. The coating material 2 can be stably transferred to the surface of aluminum material, with the result that the coating apparatus can operate well for the most part.

Figure 5A:
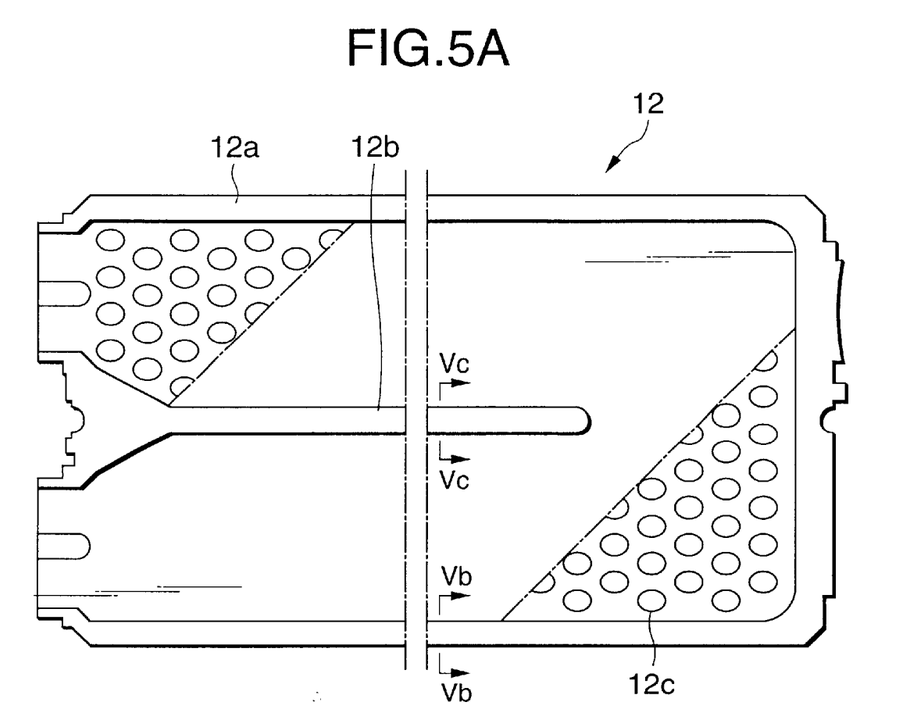
FIG. 5A is a plan view.
Figure 5B:
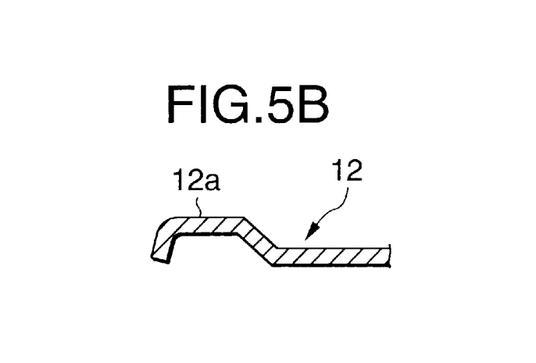
FIG. 5B is a cross-sectional view taken along line Vb—Vb shown in FIG. 5A.
Figure 5C:
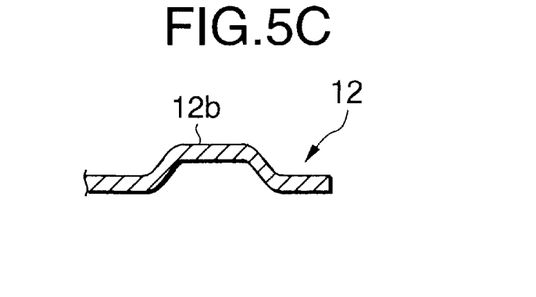
FIG. 5C is a cross-sectional view taken along line Vc—Vc shown in FIG. 5A.
Figure 7A:
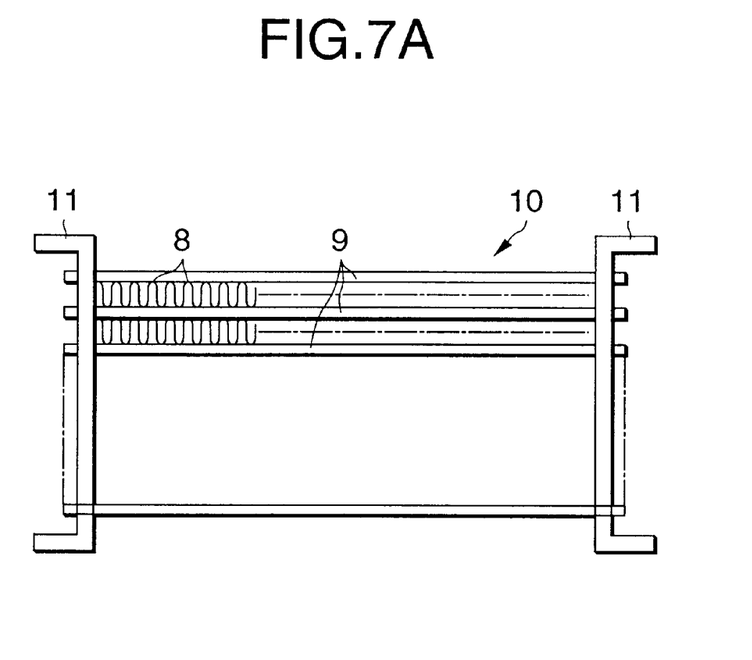
FIG. 7A is a partially-omitted front view.
Figure 7B:
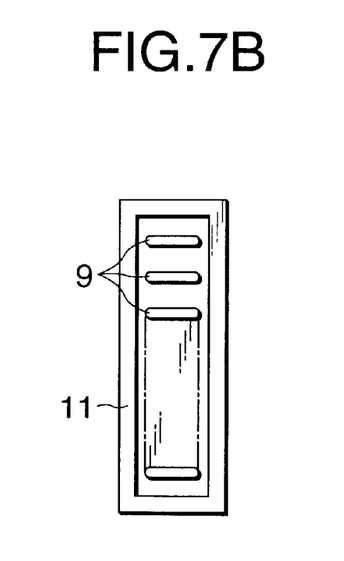
FIG. 7B is a partially-omitted side view.

The coating material 2 has high viscosity and hence can stably adhere to the portions of aluminum material where it has been transferred. For example, in a case where a heat exchanger such as that shown in FIGS. 7A and 7B is manufactured by brazing, the coating material 2 must be applied to an outer peripheral bead 12a and a center bead 12b (see FIGS. 5A to 5C) of one of two clad plates 12 constituting a heat-transfer tube 9, the top peaks of the corrugated fin 8 which are to maintain contact with the heat-transfer tube 9 after assembly, and the areas of support plates 11 which are to maintain contact with the heat-transfer tubes 9 after assembly. After transfer, the coating material 2 can stably adhere to even the narrow areas, such as the outer peripheral bead 12a, the center bead 12b, and the top peaks of the corrugated fin 8, without losing fluidity. In FIG. 5A, reference numeral 12c designates oval beads functioning to cause turbulence in the flow of coolant within the heat-transfer tube 9.

Figure 3:
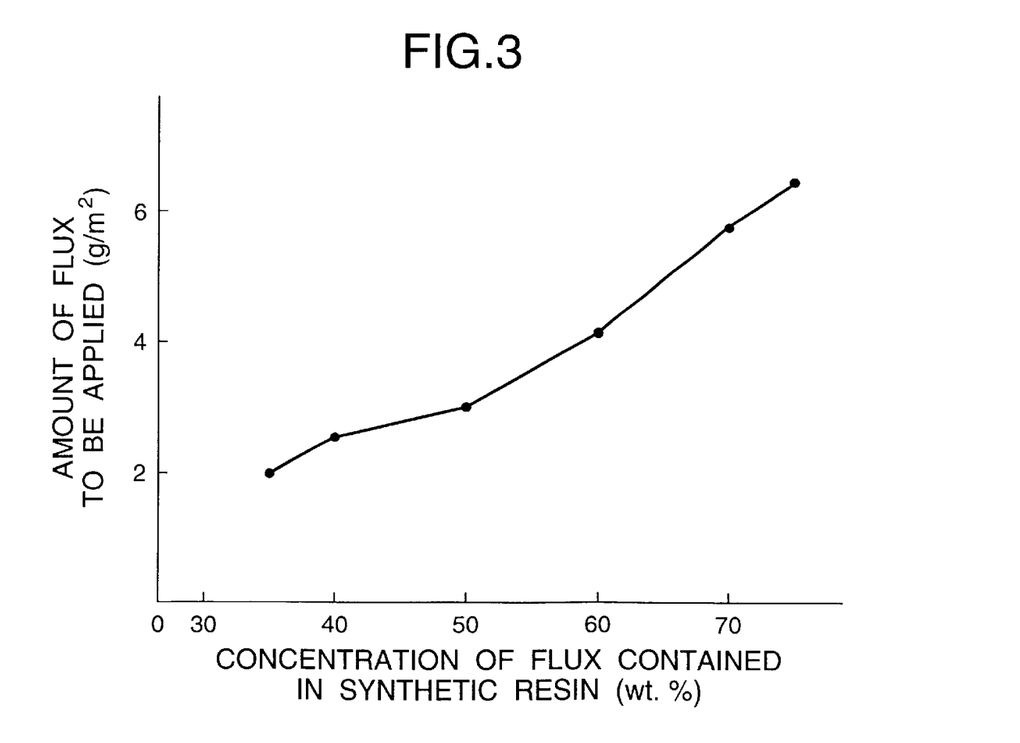
FIG. 3 is a graph showing the concentration of flux included in synthetic resin and the amount of flux to be applied.

FIG. 3 shows the relation between flux concentration (wt. %) and the amount of flux to be applied ($g/m^2$) (residual amount of flux after heating) when flux is added to polybutene having a means molecular weight of 1000, for various concentrations of flux. As the flux concentration increases, the amount of flux to be applied also increases.

Figure 4:
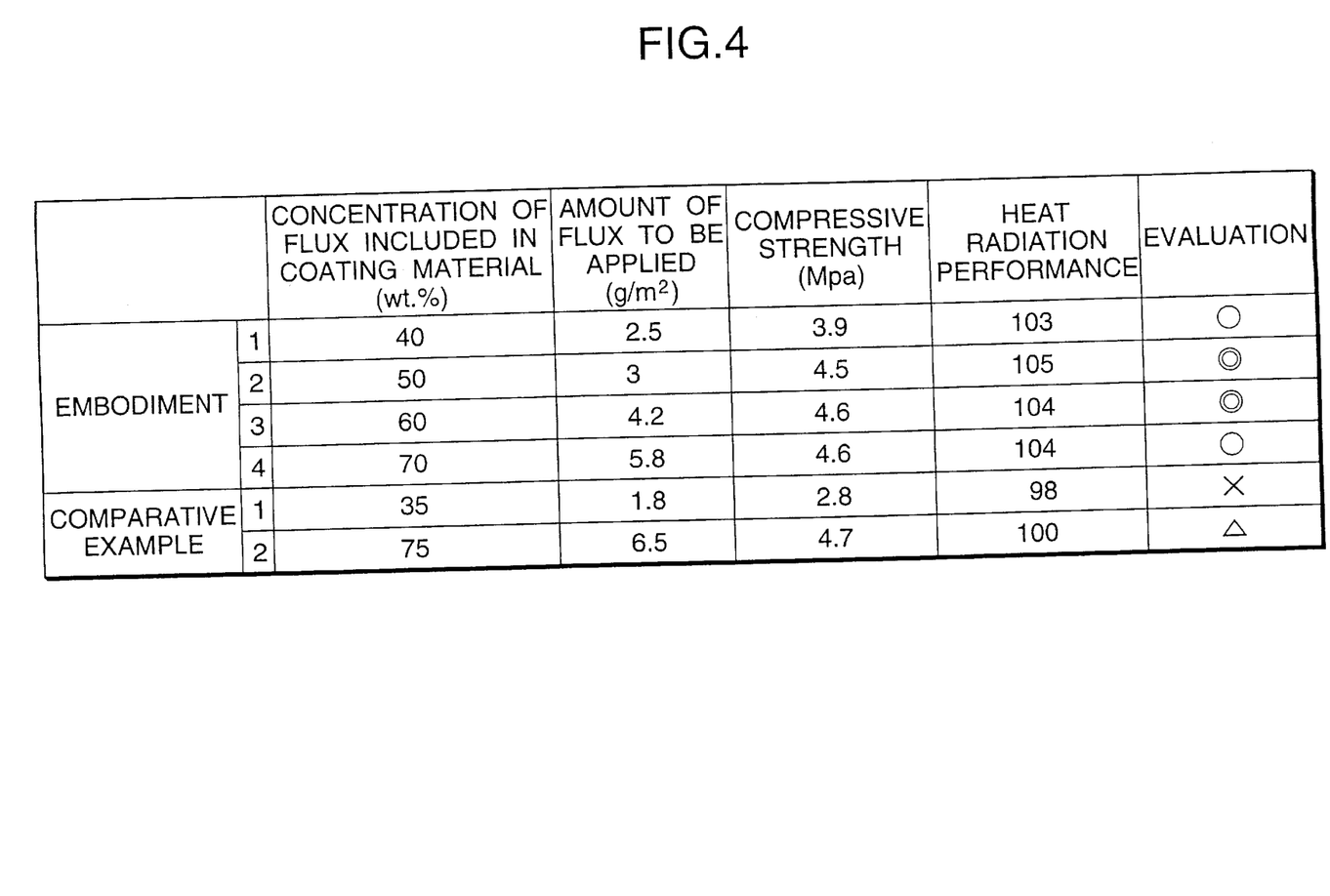
FIG. 4 is a table showing a relationship between the performance of a heat exchanger after brazing, the concentration of flux included in synthetic resin, and the amount of flux to be applied.

FIG. 4 shows a relationship between the amount of flux to be applied, the compressive strength of a heat exchanger after brazing, and the heat radiation performance of the heat exchanger.

As shown in FIGS. 7A and 7B, the heat exchanger is assembled by brazing together the heat-transfer tubes 9, the corrugated fins 8, and the support plates 11. The heat-transfer tube 9 is formed from a clad plate comprising material specified by JIS 4343 (hereinafter called "JIS 4343 material") (coating material)- material specified by JIS 3003 (hereinafter called "JIS 3003 material") (core material)-JIS 4343 material (coating material) and a clad in a proportion of 10%. The corrugated fin 8 is formed from plate material comprising JIS 3003 material doped with 1.5% Zn. The support plate 11 is formed from a clad plate comprising JIS 4343 material (coating material)-JIS 3003 material (core material)-JIS 4343 material (coating material) and a clad in a proportion of 10%. The heat-transfer tubes 9, the corrugated fins 8, and the support plates 11 are brazed under conditions such that they are pre-heated at 150° C. for three minutes in an $N_2$ gas atmosphere and are heated at 600° C. for three minutes.

The compressive strength of the heat exchanger is expressed in terms of internal pressure of the heat exchanger required for causing leakage to the outside. Heat radiation performance is normalized with respect to heat radiation performance of a heat exchanger employing a coating material of 75% flux concentration, which is taken as 100. Evaluation corresponds to over-all evaluation of a heat exchanger including compressive strength and heat radiation performance, where a double-circle symbol represents "excellent," a single-circle symbol represents "good," a triangle represents "acceptable," and a cross represents "unacceptable." A compressive strength of 3.5 Mpa or more is determined to be good.

As can be seen from FIG. 4, all the heat exchangers manufactured from coating materials having flux concentrations of 40 to 70 wt. % according to the method of the present invention were evaluated as being "good" or "excellent." In contrast, a heat exchanger manufactured from coating material having a flux concentration of 35 wt. % (Comparative Example 1) and a heat exchanger manufactured from coating material having a flux concentration of 75 wt. % (Comparative Example 2) were evaluated as being "acceptable" or "unacceptable."

Comparative Example 1 was evaluated as being "unacceptable." The reason for this is that since the coating material has a low flux concentration, the kinetic viscosity of the coating material also becomes low. In addition to a small amount of flux to be originally applied (1.8 g/cm$^2$), the coating material is removed from the areas where the coating material has been transferred, with the result that fillets formed along the joints between the heat-transfer tubes 9 and the fins 8 are insufficiently formed, thereby reducing the heat radiation performance of the heat exchanger.

Example 2 was evaluated as being "good" in spite of the compressive strength being evaluated as being "excellent." The reason for this is that since the coating material has a high flux concentration, a large amount of flux residue remain after brazing. Such flux residues deteriorates the appearance of the heat exchanger and increase ventilation resistance, thus deteriorating the heat radiation performance.

In consideration of the comparison results set forth, the coating material 2 according to the present embodiment is formed by addition of 40 to 70 wt. % flux into synthetic resin, preferably 50 to 70 wt. % flux into synthetic resin. The coating material 2 exhibits an increase in kinetic viscosity and in the amount of flux to be applied at the minimum flux concentration (50 wt. %), thereby greatly enhancing the reliability of brazed areas.

Figure 6:
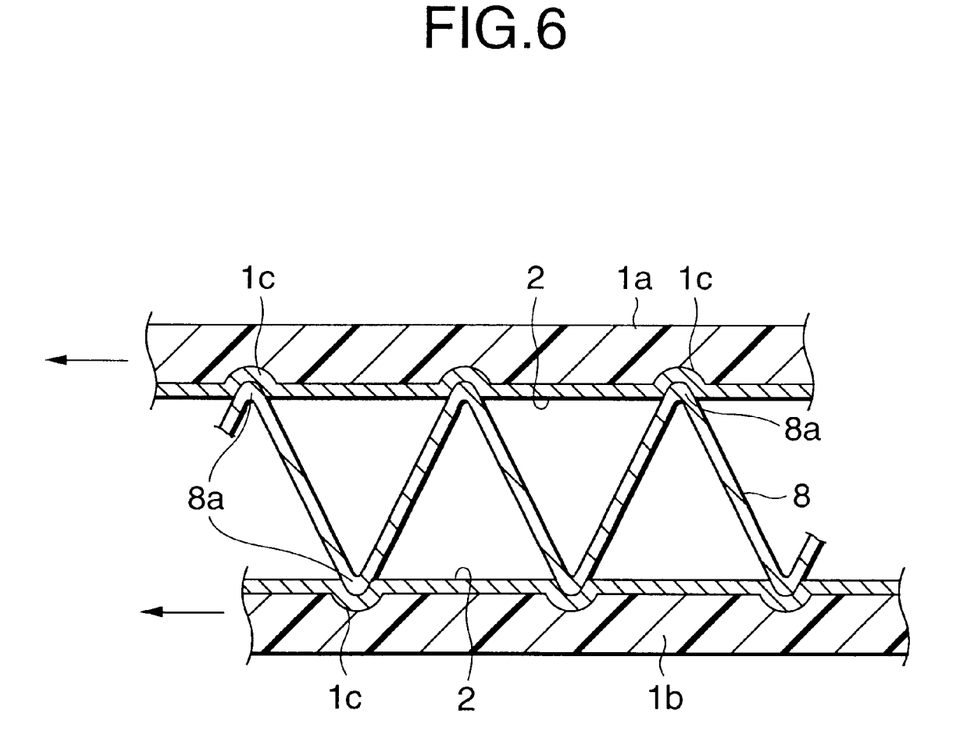
FIG. 6 is a fragmentary schematic view showing a coating apparatus for effecting a method of applying flux for use in brazing aluminum material according to another embodiment of the present invention.

FIG. 6 shows a coating apparatus capable of working the method of applying flux for use in brazing aluminum material according to another example of the present invention.

The coating method is effected by use of an coating belt, wherein at least one side of the coating belt facing aluminum material is formed from elastic material which is deflected upon receipt of pressing force from the aluminum material at the time of transfer of coating material. A coating apparatus capable of effecting the coating method differs from that mentioned in connection with the previous embodiment in only that the coating belts 1a and 1b are formed from, e.g., oil resistance rubber material. In other respects, the two coating apparatus are identical in structure.

According to this coating method of another example, the coating belts are deflected at the time of transfer of coating material, to thereby cover, with the coating material, the areas of aluminum material to be coated. Accordingly, synthetic resin doped with flux can be reliably transferred from the coating belts to the areas of the aluminum materials to be coated.

As shown in FIG. 6, in a case where aluminum material is formed into the corrugated fin 8, the coating belts 1a and 1b are pressed against top peaks 8a of the fin 8, with the result that recesses 1c are formed in corresponding portions of the coating belts 1a and 1b. Thus, the top peaks 8a of the fin 8 are covered with the recesses 1c, and the coating material 2 applied over the respective coating belts 1a and 1b is situated between the recesses 1c and the top peaks 8a and can come into sufficient contact with the top peaks 8a. In spite of the narrow area of the top peaks 8a, the coating material 2 can be transferred to the top peaks 8a without fail.

In either of the embodiments, the coating material 2 is formed by increasing the amount of flux added to synthetic resin, so that the amount of flux required for brazing is ensured by means of a small amount of coating material to be transferred. The amount of synthetic resin to be transferred can be reduced accordingly, to thereby increase the rate at which synthetic resin sublimes in a sublimation process before the brazing process and to save energy.

As has been described, synthetic resin doped with fluoride-based flux is transferred from an coating belt to the surface of aluminum material, to thereby enable coating of flux to areas requiring coating. The amount of flux added to synthetic resin is increased, to thereby make coating material highly viscous. The amount of flux required for brazing can stably adhere to the areas requiring coating. Consequently, the reliability of brazed areas can be enhanced.

The amount of flux added to synthetic resin is increased, so that the amount of flux required for brazing can be ensured by means of a small amount of coating material to be transferred. The amount of synthetic resin to be transferred can be reduced accordingly, to thereby increase the rate at which synthetic resin sublimes in a sublimation process before the brazing process and to save energy.

Further, at least one side of the coating belt facing aluminum material is formed from elastic material which is reflected upon receipt of pressing force from the aluminum material at the time of transfer of coating material. The coating belts are deflected at the time of transfer of coating material, to thereby cover the areas of aluminum material requiring coating. Consequently, synthetic resin doped with flux can be stably transferred from the coating belts to the areas of the aluminum material requiring coating, thus enhancing the reliability of brazed areas.

Figure 8:
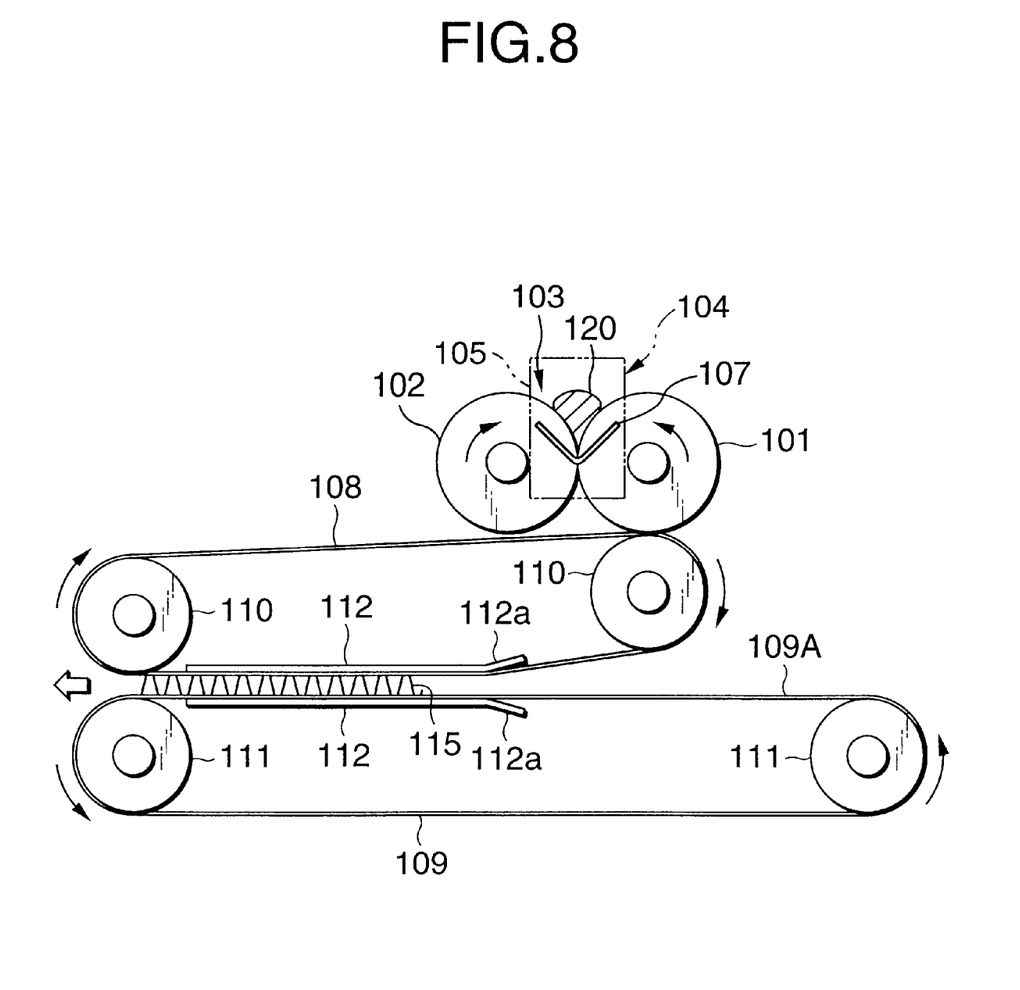
FIG. 8 is a schematic side elevation view showing a flux coating apparatus according to another embodiment of the present invention.
Figure 9:
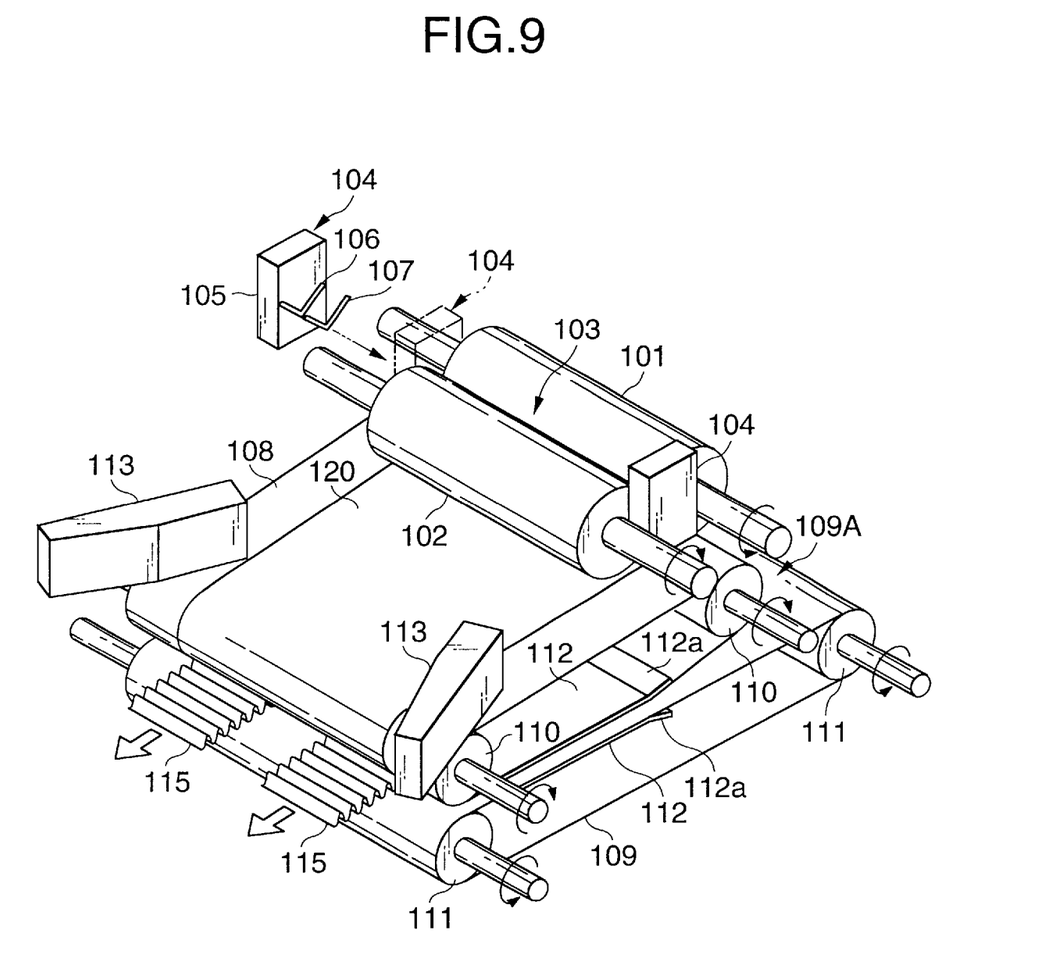
FIG. 9 is a schematic perspective view showing the flux coating apparatus according to the embodiment in FIG. 8.

FIGS. 8 and 9 show another embodiment of the flux coating apparatus. In FIGS. 8 and 9, reference numerals 101 and 102 designate a pair of feed rollers which are in contact with each other and rotated in opposite directions, as indicated by arrows, by means of an unillustrated drive means. A nipping portion between the feed rollers 101 and 102 serves as an inlet section 103 for introducing coating material 120. As shown in FIG. 8, the inlet section 103 is replenished with and stores at all times coating material 120 comprising as a dispersion medium resin material, e.g., polybutene and flux.

Dam members 104 are provided along end faces on the opposite sides of the feed rollers 101 and 102 in order to prevent the coating material 120 from flowing to the outside from the inlet section 103.

The dam member 104 comprises a dam block 105 and sealing material 107 fitted into a V-shaped groove formed in the interior surface of the dam block 105. The sealing material 107 is brought into sliding contact with and extends over the side faces of the feed rollers 101 and 102 in a V-shaped pattern.

Reference numerals 108 and 109 designate a pair of upper and lower endless coating belts formed from elastic material, such as comparatively flexible oil-resistance rubber or synthetic resin. The upper endless coating belt 108 extends between a pair of guide rollers 110, 110, and the lower endless coating belt 109 extends between a pair of guide rollers 111, 111. The upper and lower endless coating belts 108 and 109 are rotated in opposite directions, as indicated by arrows, by means of unillustrated drive means.

The smallest clearance between the endless coating belts 108 and 109 is slightly smaller than the height (or thickness) of a component 115 to be coated with flux. The clearance can be adjusted at any time by means of an unillustrated adjuster in accordance with the height of the component 115.

The lower endless coating belt 109 is formed so as to become longer than the upper endless coating belt 108 in a rearward direction from which a component is introduced between the endless coating belts 108 and 109. The thus-elongated portion of the lower endless coating belt 109 is taken as a component inlet section 109A for receiving the component 115 from an unillustrated component transportation line.

In the present embodiment, opposing portions of the endless coating belts 108 and 109 are provided with presser plates 112 for pressing the opposing portions of the endless coating belts 108 and 109 against the component 115.

The clearance between the endless coating belts 108 and 109 is adjusted by vertical adjustment of the front-end guide rollers 110 and 111 of the respective roller pairs 110 and 111 and the presser plates 112, 112.

The rear end portions of the respective presser plates 112, 112 are tapered toward the outside, to thereby facilitate introduction of the component 115. Further, the rear guide roller 110 provided in the upper endless coating belt 108 is located at a slightly elevated position, to thereby widen the clearance between the upper and lower endless coating belts 108 and 109.

In a case where the coating material 120 is applied to one of the two sides of the component 115; for example, an upper side of the component 115, one of the pair of feed rollers 101 and 102; for example, the feed roller 101, is brought into contact with the upper endless coating belt 108, as shown in FIG. 8.

The present embodiment has described a case where the coating material 120 is applied to the component 115; e.g., both sides of a corrugated outer fin constituting a core of an evaporator or condenser for use in an automobile cooling system. Although omitted from FIGS. 8 and 9, a second pair of feed rollers 101 and 102 is also disposed similarly in the vicinity of the lower endless coating belt 109, and one of the feed roller pair is situated so as to remain in contact with the belt 109.

Flux guides 113 (only the pair of flux guides 113 disposed on the upper endless coating belt 108 are shown in FIG. 9) are provided so as to remain a sliding contact with the respective endless coating belts 108 and 109 in order to collect the coating material 120 transferred from the feed rollers 101 to a required width; for example, the width of the feed roller 101.

Coating of flux to the component 115 by the flux coating apparatus having the foregoing configuration will now be described.

The feed rollers 101 and 102 are rotated in opposite directions, as designated by arrows shown in FIG. 8, and the endless coating belts 108 and 109 are rotated in opposite direction, as designated by arrows shown in FIG. 8.

Through rotation of the feed rollers 101 and 102, the coating material 120 stored in the inlet section 103 uniformly adheres to the peripheral surface of the feed rollers 101 and 102.

The coating material 120 stored in the inlet section 103 is prevented from flowing laterally by means of the dam members 104 disposed on the opposite sides of the inlet section 103.

The feed roller 101 remains in contact with the endless coating belt 108, and hence the coating material 120 adhering to the peripheral surface of the feed roller 101 is uniformly transferred to the surface of the endless coating belt 108.

Although omitted from the drawings, the feed rollers 101 and 102 are disposed in the same manner as mentioned previously, and the coating material 120 is uniformly fed from either of the feed rollers 101 and 102 to the surface of the lower endless coating belt 109.

When the component 115 is introduced between the endless coating belts 108 and 109, the endless coating belts 108 and 109 are brought into elastic contact with the top peaks of the corrugated component 115, and the coating material 120 is uniformly applied to the top peaks of the corrugation during the process of feeding of the component 115 in the direction designated by the outlined arrow.

As mentioned above, in the flux coating apparatus according to the present embodiment, the coating material 120 is uniformly fed to the surface of the pair of upper and lower endless coating belts 108 and 109 from the feed rollers 101 and 102. Since the coating material 120 can be uniformly applied to the top peaks of the corrugated component 115 by means of the endless coating belts 108 and 109, the coating material 120 is prevented from being applied in insufficient or excessive amount, thus properly brazing the component 115.

As mentioned above, flux is automatically applied to the component 115, thus preventing splashing of flux, which would otherwise be caused by manually painting flux with a brush, and staining of surrounding facilities, which would otherwise be caused by splashing of flux.

Particularly, in the present embodiment, the coating material 120 adhering to the surface of the endless coating belts 108 and 109 is collected to a desired width by means of the flux guides 113. Consequently, the coating material 120 can be prevented from staining surrounding facilities, which would otherwise be caused by the coating material 120 spreading to and falling from the side edges of the respective endless coating belts 108 and 109.

Further, the component inlet section 109A is provided on the lower endless coating belt 109 so as to extend beyond the upper endless coating belt 108 in a rearward direction, and hence the component 115 can be readily transferred to the component inlet section 109A from the unillustrated component transfer line. Accordingly, the component 115 can be readily and smoothly introduced between the upper and lower endless coating belts 108 and 109, thus efficiently coating the component 115 with flux.

In the previous embodiment, a corrugated outer fin for use as a core of an evaporator or condenser is employed as the component 115 to be coated with flux. However, it goes without saying that the component is not limited to such an corrugated outer fin.

Figure 10:
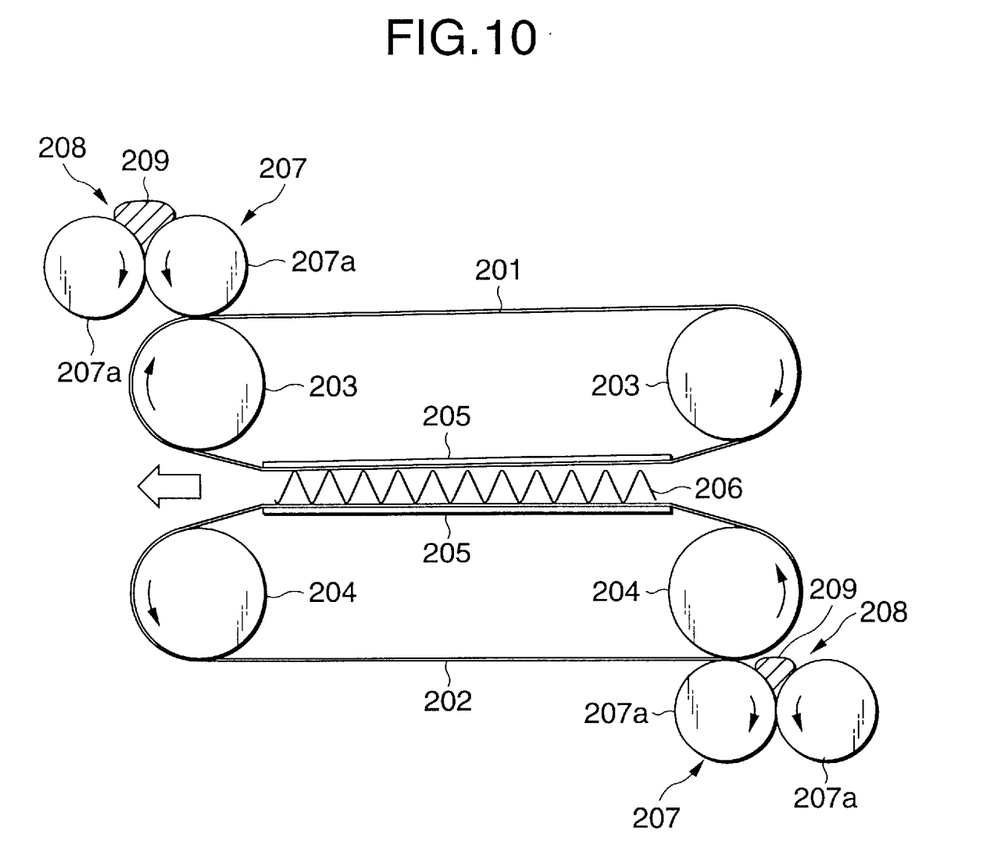
FIG. 10 is a schematic descriptive view showing a flux coating apparatus according to still another embodiment of the present invention.
Figure 11:
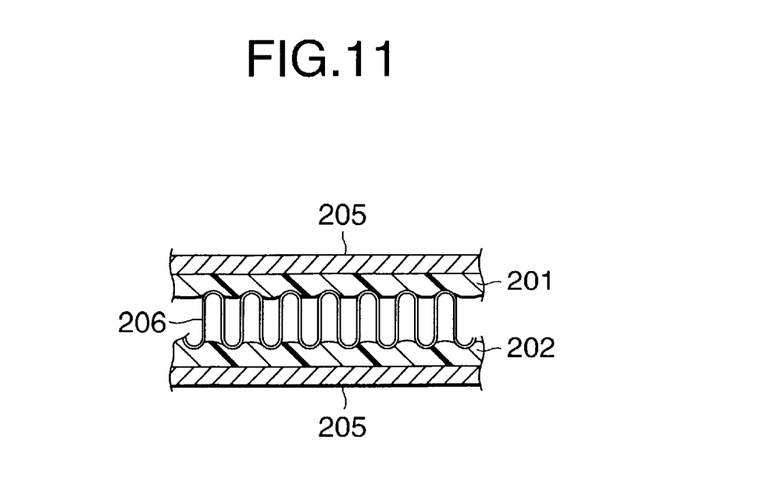
FIG. 11 is an enlarged cross-sectional view showing the principal section of the flux coating apparatus according to the embodiment in FIG. 10.

FIGS. 10 and 11 show a still another embodiment of the flux coating apparatus according to the present invention. In FIGS. 10 and 11, reference numerals 201 and 202 designate a pair of upper and lower coating endless belts formed from elastic material, such as comparatively flexible oil-resistance rubber or synthetic resin. The upper endless coating belt 201 extends between a pair of guide rollers 203, 203, and the lower endless coating belt 202 extends between a pair of guide rollers 204, 204. The upper and lower coating endless belts 201 and 202 are rotated in opposite directions, as indicated by arrows, by means of unillustrated drive means.

As will be described later, the endless coating belts 201 and 202 are spaced a predetermined interval from each other, and the opposing portions of the endless coating belts 201 and 202 are provided with presser plates 205 for pressing the opposing portions of the endless coating belts 201 and 202 against the top peaks of a corrugated outer fin 206 for use in a heat exchanger core.

The presser plates 205, 205 are disposed slightly out of parallel such that the clearance between the pressure plates 205, 205 becomes sufficiently wider than the height of the outer fin 206.

The presser plates 205, 205 are vertically adjustable by means of an unillustrated adjuster, and the clearance between presser plates 205, 205 can be adjusted at any times such that opposing surfaces of the coating endless belts 201 and 202 can be resiliently brought into contact with the top peaks of the corrugated outer fin 206 at appropriate contact pressure so as not to deform the corrugation.

The coating material 209 is uniformly applied at all times to the surface of the endless coating belts 201 and 202 from respective feeders 207.

The feeder 207 comprises a pair of feed rollers 207a, 207a which are in contact with each other and rotated in opposite directions, as indicated by arrows, by means of an unillustrated drive means. A nipping portion between the feed rollers 207a, 207a serves as an inlet section 208 for introducing the coating material 209. The inlet section 208 is replenished with and stores the slime-like coating material 209 at all times.

One of the upper roller pairs 207a, 207a is brought into contact with the endless coating belt 201, and one of the lower roller pairs 207a, 207a is brought into contact with the endless coating belt 202. The slime-like coating material 209 adhering to the surface of the feed rollers 207a is uniformly transferred to the surface of the endless coating belts 201 and 202.

In the flux coating apparatus according to the present embodiment having the foregoing configuration, when the outer fin 206 is introduced between the endless coating belts 201 and 202, the endless coating belts 201 and 202 are brought into elastic contact with the top peaks of the corrugated outer fin 206 at a given, uniform contact pressure, and the coating material 209 can be uniformly applied to t he top peaks of the corrugated outer fin 206 during the process of feeding of the outer fin 206 in the direction designated by the outlined arrow.

The coating material 209 is prevented from being applied to the top peaks of the outer fin 206 in insufficient or excessive amount, thus enabling proper brazing of unillustrated flat coolant tubes which remain in contact with the each side of the outer fins 206.

As mentioned above, by means of the presser plates 205, 205 the pair of endless coating belts 201 and 202 are uniformly brought into resilient contact with the top peaks of the corrugated outer fin 206 at a given contact pressure, thereby preventing deformation of the corrugated outer fin 206.

The coating material 209 can be automatically applied to the top peaks of the corrugated outer fin 206 by means of the pair of endless coating belts 201 and 202, thus preventing staining of surrounding facilities, which would otherwise be caused by splashing of the coating material 209.

Particularly, in the present embodiment, the clearance between the pair of presser plates 205, 205 in the vicinity of a component inlet section is set so as to become sufficiently greater than the height of the outer fin 206, thereby enabling smooth introduction of the outer fin 206 into the clearance between the opposing surfaces of the pair of endless coating belts 201 and 202 and realizing smooth flux coating operation.

The presser plates 205, 205 can be vertically adjusted by means of an unillustrated adjuster. Vertical adjustment of the presser plates 205, 205 enables appropriate control of contact pressure at which the pair of endless coating belts 201 and 202 are brought into contact with the top peaks of the outer fin 206, optimization of the amount of flux applied to the top peaks of the outer fin 206, and thorough prevention of deformation of the corrugated outer fin 206.

The embodiment has described an example in which an outer fin for use with the core of any of various types of heat exchangers is used as the corrugated component 206. However, the present invention is not limited to the corrugated component and may also be applied to application of flux to a component which is required to be coated with flux on both sides.

Figure 13:
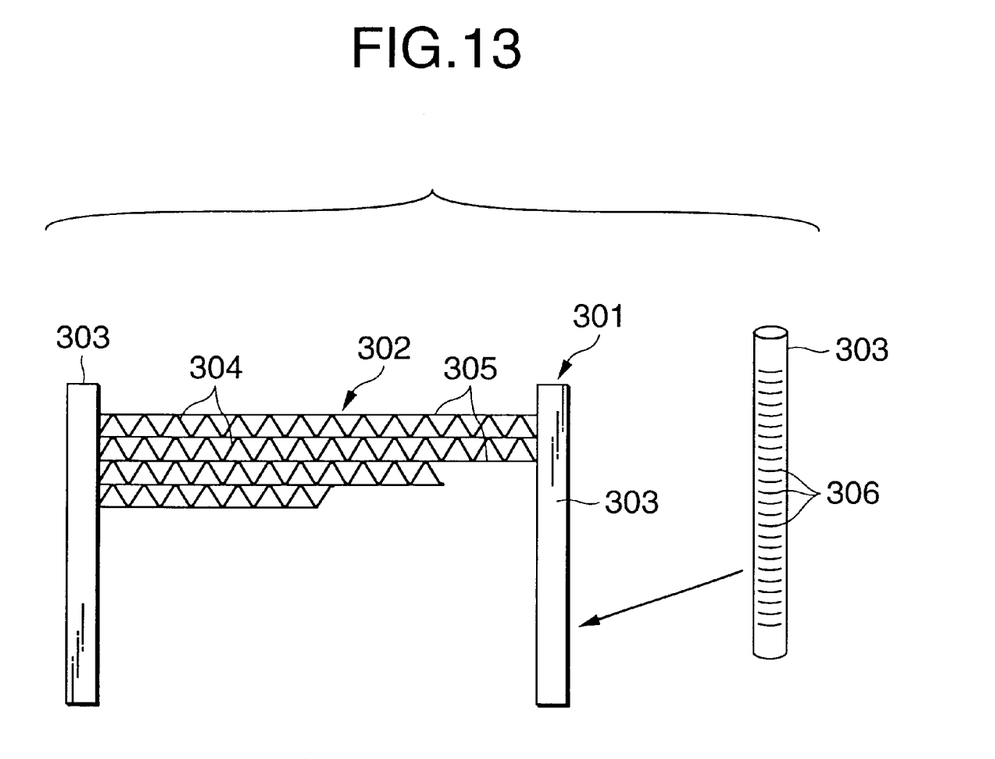
FIG. 13 is a descriptive view showing one example of a heat exchanger which is an object of the present invention.

FIG. 13 shows a condenser employed in an automobile cooling system as a heat exchanger 301.

The condenser 301 comprises a condenser core 302 and a pair of header tanks 303.

The condenser core 302 is constituted by stacking in an alternating manner a plurality of corrugated outer fins 304 and plurality of flat coolant tubes 305 to a layer of required width.

A plurality of tube insertion holes 306 equal in number to coolant tubers of the condenser core 302 are formed in each of header tanks 303, and the ends of the respective coolant tubes of the condenser core 302 are inserted into the tube insertion holes 306, thus constituting the condenser 301.

In order to braze together contact portions between the outer fins 304, the coolant tubes 305, and the header tanks 303, clad material—which is formed by laying on the surface of aluminum material, such aluminum or an aluminum alloy, a brazing layer formed from metal of the same family as aluminum—is used as a material of the outer fins 304, the coolant tubes 305, and the header tanks 303. In some cases, as will be described later, either the outer fins 304 or the coolant tubers 305 may be formed from clad material.

Processes performed in the manufacture of the condenser 301 will be described in sequence by reference to FIGS. 12A to 12D.

Figure 12A:
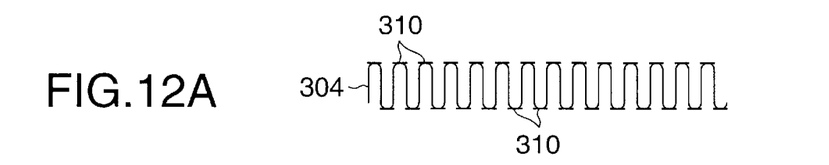
FIGS. 12A to 12D are descriptive views showing a method of manufacturing a heat exchanger according to the present invention.

As shown in FIG. 12A, coating material 310 containing flux is applied to the top peaks of the corrugated outer fin 304. The coating material 310 is uniformly applied to the top peaks of the corrugated outer fins 304 through use of the aforementioned coating apparatuses.

Figure 12B:
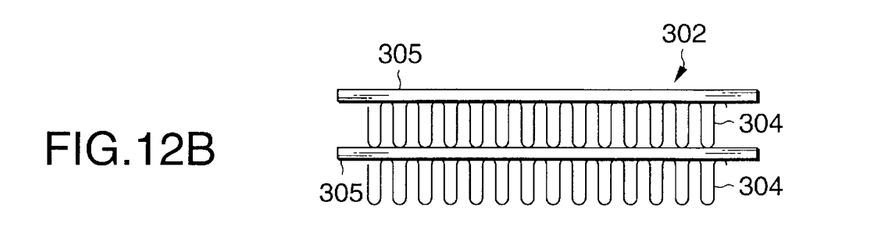

As shown in FIG. 12B, after the outer fins 304 have been coated with the coating material 310, a plurality of outer fins 304 and a plurality of flat coolant tubes 305 are stacked in an alternating manner, thereby constituting the condenser core 302 to a layer of required width.

A reinforcement plate 307 (see FIG. 12C) formed from a metal of the same family as the outer fins 304 and the coolant tubes 305 is attached to the topmost outer fin 304 and the lowermost outer fin 304 of the condenser core 302.

Figure 12C:
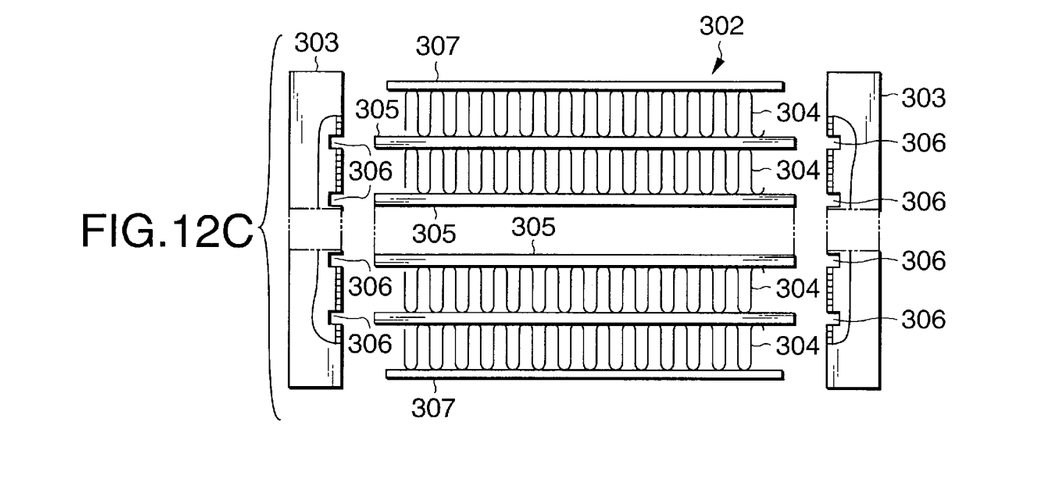
Figure 12D:
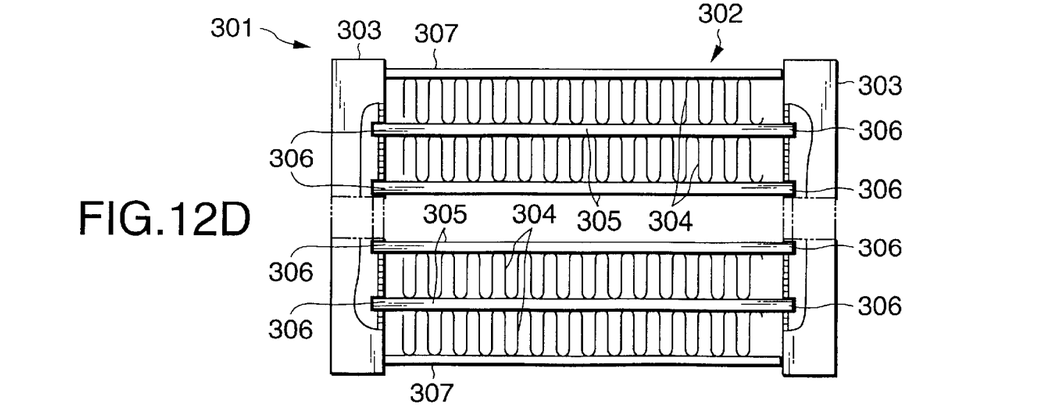

As shown in FIG. 12C, the ends of the respective coolant tubes 305 of the condenser core 302 and the tube insertion holes 306 of the pair of header tanks 303 are aligned with one another. As shown in FIG. 12D, the ends of the coolant tubes 305 are inserted into the corresponding tube insertion holes 306.

In this case, the slime-like coating material 310 is applied to the peripheral edges of tube insertion holes 306 of the header tanks 306 or to the ends of the coolant tubes 305.

In addition to the coolant tubes 305, the ends of the reinforcement plates 307 are brazed to the header tanks 303. So long as the coating material 310 is applied to the surfaces of the header tanks 303 where the tube insertion holes 306 are formed in a row, the number of times coating material is applied can be reduced. Further, as mentioned previously, the slime-like coating material 310 can be readily and uniformly applied to the surface of the header tanks 303 by means of an unillustrated paint roller.

After having been assembled by connecting the condenser core 302 to the pair of header tanks 303, the condenser 301 is heated in an unillustrated heating furnace, to thereby braze together the top peaks of the corrugated outer fins 304, the coolant tubes 305 remaining in contact with the outer fins 304, and the reinforcement plates 307. Simultaneously, the peripheral edges of the respective tube insertion holes 306 of the header tanks 303 and the respective ends of the coolant tubes 305 are brazed together. Further, the reinforcement plates 307 are butt-brazed to the side surface of the respective header tanks 303.

As mentioned previously, the outer fins 304 and the coolant tubes 305 are brazed together by means of the coating material 310 applied to the top peaks of the corrugated outer fins 304. However, there is no requirement that both the outer fins 304 and the coolant tubes 305 be formed from clad material. Even if either the outer fins 304 or the coolant tubes 305 are formed from clad material, they can be brazed together without fail.

As has been mentioned above, at the time of assembly of the condenser 301, heat exchanger manufacturing method according to the present invention involves application of the slime-like coating material 310 to solely the top peaks of the corrugated outer fins 304 which are stacked on the coolant tubes 305 of the condenser core 302 in an alternating manner and must be brazed. The areas other than those required to be brazed are not coated with the coating material 310, thus eliminating wasteful consumption of the coating material 310 and advantageous manufacture of the core at reduced cost.

As mentioned above, the coating material 310 is applied to solely the top peaks of the outer fins 304. Further, slime-like coating material comprising resin material as a dispersion medium is used, there can be prevented deterioration of the working environment and staining of surrounding facilities, which would otherwise be caused by splashing of the flux 310.

Further, according to the present embodiment, the slime-like coating material 310 is applied beforehand to either the peripheral edge of each of the tube insertion holes 306 formed in the header tanks 303 or the edges of the coolant tubes 305 to be inserted into the tube insertion holes 306. Simultaneously with brazing of the outer fins 304 and the coolant tubes 305 through heating in a heating furnace, the peripheral edge of each of the tube insertion holes 306 of the header tanks 303 and the ends of the respective coolant tubes 305 are brazed, thus improving work efficiency and productivity in manufacture of a heat exchanger.

Although the present embodiment has described an example of manufacture of a condenser used in an automobile cooling system, advantageous results which are the same as those described previously can be attained by application of the present invention to manufacture of a heat exchanger such as an evaporator, a heater, or a radiator.

Although the invention has been described in its preferred form with a certain degree of particularity, it is understood that the present disclosure of the preferred form can be d arrangement of parts without departing from the spirit and the scope of the invention as hereinafter claimed.

What is claimed is:

1. A method for applying flux for use in brazing aluminum material, comprising the steps of:

uniformly dispersing and mixing a fluoride-based flux in and with a synthetic resin, said resin being fluid at room temperature and subliming at a temperature lower than a brazing temperature, to thereby produce a mixture of the flux and the synthetic resin, wherein an amount of the fluoride-based flux is 40 to 70 wt. % of the mixture;

applying the mixture to a travelling coating belt;

transferring the mixture to a surface of the aluminum material; and wherein a side of said travelling coating belt which faces the aluminum material is formed from an elastic material which deflects from a pressing force from the aluminum material during said transferring step.

2. A method according to claim 1, wherein said synthetic resin comprises polybutene.

3. A method according to claim 1, wherein the amount of the fluoride-based flux is set to 50 to 70 wt. % of the mixture.

4. A method for applying flux for use in brazing an aluminum material, comprising the steps of:

uniformly dispersing and mixing a fluoride-based flux with a synthetic resin to produce a mixture of the flux and the synthetic resin, wherein said resin is fluid at room temperature and subliming at a temperature lower than a brazing temperature;

applying the mixture to a travelling coating belt; and transferring the mixture to a surface of the aluminum material wherein a side of said travelling coating belt which faces the aluminum material is formed from an elastic material which deflects from a pressing force from the aluminum material during said transferring step.

\* \* \* \* \*